Sept. 3, 1929.   B. L. ELLIOTT   1,727,279
PARACHUTE
Filed Sept. 24, 1928   2 Sheets-Sheet 2
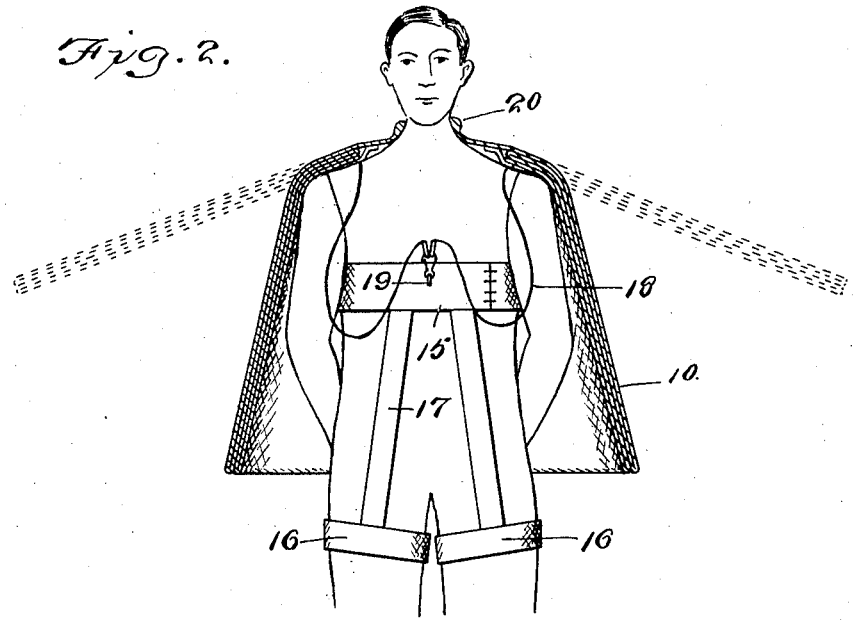
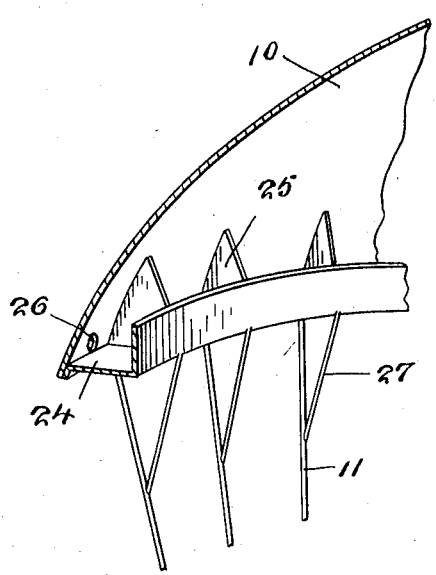

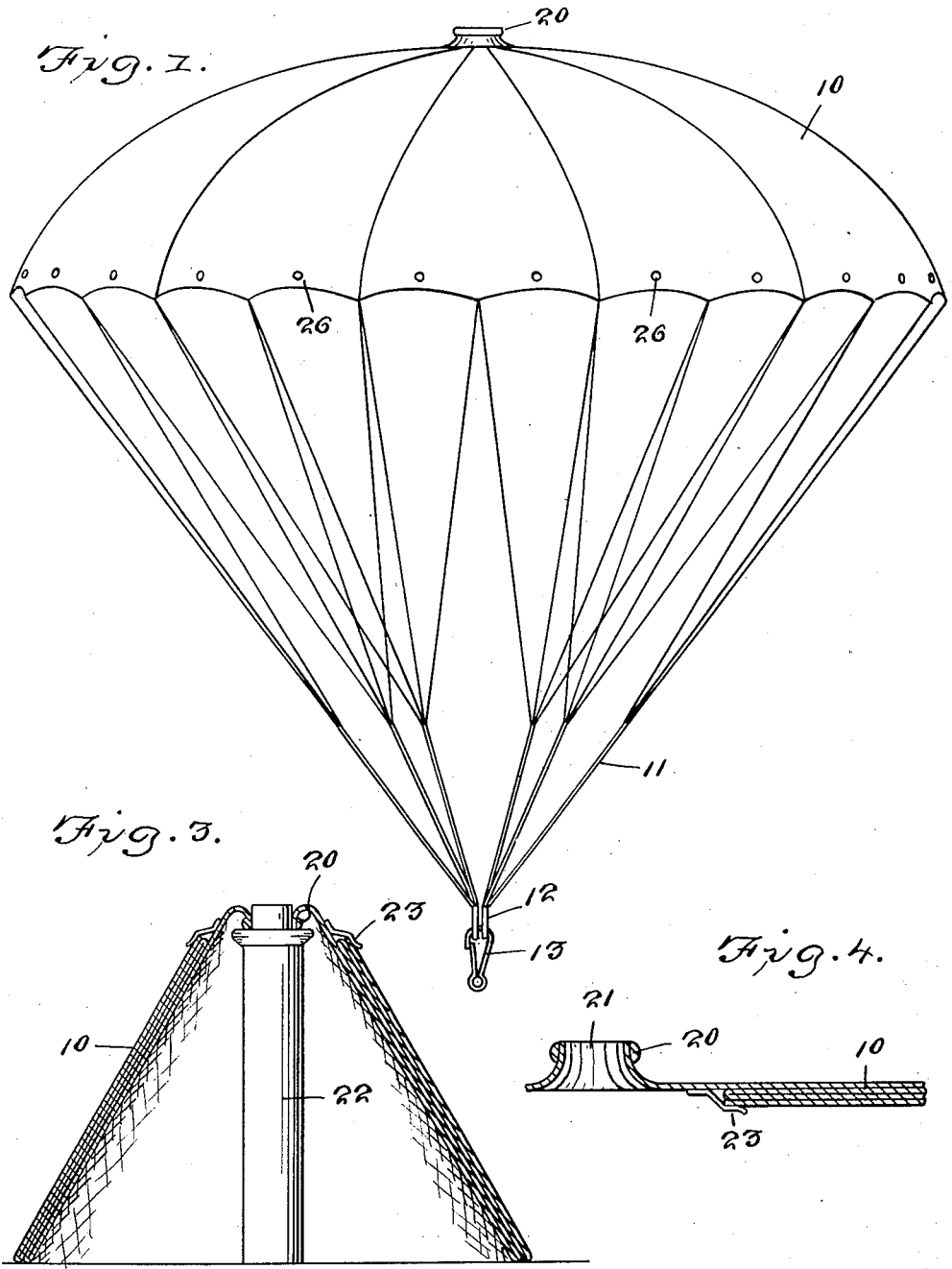

Patented Sept. 3, 1929.

1,727,279

UNITED STATES PATENT OFFICE.

BENJAMIN L. ELLIOTT, OF BROWN COUNTY, OHIO.

PARACHUTE.

Application filed September 24, 1928. Serial No. 308,067.

This invention relates to parachutes, an object being to provide a parachute which is so folded and adjusted for use as to insure immediate opening, the releasing operation of the parachute being automatic, in that its position is such as to collect the air and spread the parachute body immediately at the beginning of a descent.

Another object of the invention is the provision of means for folding and adjusting the parachute for use wherein the natural inclination of the user to spread his arms when making a jump, is utilized to insure opening of the parachute.

Another object of the invention is the provision of means to stabilize the parachute and prevent rotary and lateral gyrations during descent, and thus insure an easier and more comfortable descent, and render the parachute more susceptible to control.

With the above and other objects in view, the invention further includes the following novel features and details of construction, to be hereinafter more fully described, illustrated in the accompanying drawings and pointed out in the appended claims.

In the drawings:—

Figure 1 is an elevation of a parachute constructed in accordance with the invention and shown in extended position.

Figure 2 shows the parachute folded and arranged for use.

Figure 3 illustrates the manner in which the parachute is folded.

Figure 4 is a fragmentary sectional view showing one of the fold retaining clips.

Figure 5 is a fragmentary perspective view of a portion of the body of the parachute and showing the stabilizing gutter.

Referring to the drawings in detail wherein like characters of reference denote corresponding parts, the reference character 10 indicates the body of the parachute which may be made of any suitable material, and which, when extended is of umbrella-like form and in this respect resembles the ordinary parachute. Secured to the edges of the body of the parachute are shroud lines 11 whose lower ends are secured to rings 12.
These rings are connected by means of a hook 13, so that the rings may be separated and the body of the parachute turned inside out for folding operation as will be later explained. The hook 13 is connected to a suitable harness which as shown includes a belt 15 and leg encircling straps 16. The belt 15 is designed to be worn around the body beneath the arm pits and is connected to the straps 16 through the medium of straps 17. The belt 15 and straps 16 may have their ends detachably connected by any suitable means which will permit of a quick and secure connection. Cables 18 may be connected to the hook 13 and have their ends attached to the strap 15 as shown at 19.

The body 10 of the parachute is provided with a central opening and arranged within this opening and secured in position by any suitable means is an annular elastic member 20. The member 20 has an opening 21 of sufficient size to permit of the convenient passage of the head of the user, so that the parachute may be positioned as shown in Figure 2 with the elastic member 20 surrounding the wearer's neck. However, as stated, the opening 21 is of sufficient size to permit the elastic member to readily pass over the head.

The body 10 is designed to be adjusted upon the shoulders of the user as shown in Figure 1 and for this purpose, the body is folded in a novel manner. For this purpose, the body is placed upon a pedestal or other support 22 with the elastic member 20 at the top of the post and the body turned wrong side out. A portion of the body is then folded upward beneath spring clips 23 after which the remaining portion is also folded upward beneath the clips with the latter retaining them in place. The number of folds depends upon the size of the parachute. The folding position of the parachute body is clearly shown in Figures 3 and 4 of the drawings. After the folding operation, the parachute body is reversed so that the annular elastic member 20 will be positioned as shown in Figure 4 to receive the head of the user.

By reference to Figure 2 it will be seen that when the parachute is attached in position for use, downward descent will cause the parachute to spread due to wind resistance, this spreading action being illustrated by dotted lines in Figure 2. However, to hasten this spreading action and insure rapid and positive opening of the parachute, use is made of the natural inclination of a person to spread his arms when jumping. Thus, as shown in Figure 2 of the drawings it will be seen that when the wearer at the initial stage of the jump spreads his arms outward, this spreading movement of the arms will materially assist in spreading the folded parachute, so that the air will enter the same and the parachute body will be positively and rapidly extended.

As is well known, a parachute in descending will oscillate both laterally and circumferentially, these gyrations causing a material interference with the control of the parachute as well as considerable inconvenience to the jumper. This is overcome in the present invention by providing a gutter 24 which is secured within the parachute body and extends around the periphery thereof as shown in Figure 5 of the drawings. This gutter is connected to the body by means of transversely arranged stays 25, and the body is provided with spaced openings 26 which open into the gutter. Stay cables 27 connect the inner edge of the gutter with the shroud lines 11.

During a descent, the parachute body will be filled with air, a portion of which will escape through the opening 21 and will act in a measure to stabilize the parachute. Other air will rush outward to the edges of the parachute and will ordinarily cause both circumferential and lateral oscillations. However, in the parachute shown and described, this air rushing to the outer edge of the parachute will enter the gutter 24 and will act by reason of the stays 25 to hold the parachute against tendency to rotate, while the even escape of air through the opening 26 will resist any tendency of the parachute to rock. As the parachute will thus descend without these gyratory movements, it may be more readily manipulated by pulling upon the shroud lines 11 to control its direction of flight.

The invention is susceptible of various changes in its form, proportions and minor details of construction and the right is herein reserved to make such changes as properly fall within the scope of the appended claims.

Having described the invention what is claimed is:—

1. In a parachute, a foldable body having a central opening therein of sufficient size to permit of the passage of a person's head, said body being adapted to be folded in cape-like form, spring clips carried by the body and spaced around the opening to yieldingly hold said body folded, shroud lines extending from the body, and means to attach said lines to the body of the user.

2. In a parachute, a body having an umbrella-like form and an opening in its top, and a gutter extending circumferentially around the edge of the body, partitions spaced around and extending transversely of the gutter, and said body having air escape openings spaced around the gutter.

In testimony whereof I affix my signature.

BENJAMIN L. ELLIOTT.